(12) United States Patent
Feldmann (10) Patent No.: US 9,175,639 B2
(45) Date of Patent: Nov. 3, 2015

(54) PLUNGER VALVE FOR A PROPANE CARBURETOR

(71) Applicant: Clifford Feldmann, St. Cloud, FL (US)

(72) Inventor: Clifford Feldmann, St. Cloud, FL (US)

( * ) Notice: Subject to any disclaimer, the term of this patent is extended or adjusted under 35 U.S.C. 154(b) by 0 days.

(21) Appl. No.: 14/318,225

(22) Filed: Jun. 27, 2014

(65) Prior Publication Data

US 2015/0034054 A1    Feb. 5, 2015

Related U.S. Application Data

(63) Continuation of application No. 14/014,862, filed on Aug. 30, 2013, now Pat. No. 8,777,188, and a continuation-in-part of application No. 12/983,795, filed on Jan. 3, 2011, now abandoned.

(60) Provisional application No. 61/695,226, filed on Aug. 30, 2012, provisional application No. 61/291,991, filed on Jan. 4, 2010.

(51) Int. Cl.

| F02B 43/00 | (2006.01) |
|---|---|
| F02M 25/07 | (2006.01) |
| F16K 31/44 | (2006.01) |
| F02M 21/02 | (2006.01) |
| F02M 9/08 | (2006.01) |
| F02M 21/04 | (2006.01) |

(Continued)

(52) U.S. Cl.
CPC ............... *F02M 21/023* (2013.01); *F02D 9/16* (2013.01); *F02M 9/08* (2013.01); *F02M 21/0209* (2013.01); *F02M 21/0212* (2013.01); *F02M 21/0233* (2013.01); *F02M 21/0239* (2013.01); *F02M 21/04* (2013.01); *F02M 7/133* (2013.01); *Y02T 10/32* (2013.01)

(58) Field of Classification Search
CPC ....... F02M 21/02; F02M 21/04; F02M 7/133; F02M 25/0777; F02B 43/00; F02D 9/00; F01L 9/02; F02C 7/22; B62D 5/097
USPC ................................. 123/527, 437; 251/213
See application file for complete search history.

(56) References Cited

U.S. PATENT DOCUMENTS

| 2,615,694 A | 10/1952 | Olson |
|---|---|---|
| 3,326,520 A | 6/1967 | Guenther |
| 3,484,084 A * | 12/1969 | Hennemann et al. ........ 261/41.5 |

(Continued)

FOREIGN PATENT DOCUMENTS

CN    201610805    10/2010

OTHER PUBLICATIONS

International Search Report and Written Opinion dated Apr. 15, 2011 as issued in International Application No. PCT/US2011/020086 filed Jan. 4, 2011, which claims priority to U.S. Appl. No. 12/983,795 similar to the instant application.

(Continued)

*Primary Examiner* — Lindsay Low
*Assistant Examiner* — Syed O Hasan
(74) *Attorney, Agent, or Firm* — Superior IP, PLLC; Dustin L. Call (57) ABSTRACT

A plunger valve. The plunger valve includes a body and a set of flutes on the body configured to reduce wedging during operation and eliminate flutter when connected to a diaphragm. The set of flutes includes at least four flutes and are each symmetrically spaced about the axis of the body. The plunger valve also includes a tip.

20 Claims, 11 Drawing Sheets

(51) Int. Cl.
*F02D 9/16* (2006.01)
*F02M 7/133* (2006.01)

(56) References Cited

U.S. PATENT DOCUMENTS

| | | | |
|---|---|---|---|
| 3,491,859 A | 1/1970 | Farr | |
| 3,523,676 A * | 8/1970 | Barker | 251/129.05 |
| 4,433,664 A | 2/1984 | Rodrigues | |
| 6,402,124 B1 | 6/2002 | Pattullo et al. | |
| 6,425,573 B1 | 7/2002 | Suzuki | |
| 6,827,337 B2 | 12/2004 | Terakado | |
| 7,007,931 B2 | 3/2006 | Tobinai | |
| 7,114,708 B2 * | 10/2006 | Douyama et al. | 261/44.6 |
| 7,287,741 B2 * | 10/2007 | Horikawa et al. | 261/44.6 |
| 7,424,886 B1 | 9/2008 | Herzer | |
| 7,631,636 B2 | 12/2009 | Herzer | |
| 7,690,347 B2 | 4/2010 | Herzer | |
| 7,703,430 B2 | 4/2010 | Herzer | |
| 7,730,868 B2 | 6/2010 | Herzer | |
| 7,735,464 B2 | 6/2010 | Herzer | |
| 7,739,996 B2 | 6/2010 | Herzer | |
| 7,743,755 B2 | 6/2010 | Herzer | |
| 7,748,365 B2 | 7/2010 | Herzer | |
| 7,854,219 B2 | 12/2010 | Herzer | |
| 7,874,275 B1 | 1/2011 | Herzer | |
| 7,878,170 B1 | 2/2011 | Herzer | |
| 8,109,251 B2 | 2/2012 | Herzer | |
| 2011/0067677 A1 | 3/2011 | Herzer et al. | |
| 2011/0083645 A1 | 4/2011 | Herzer | |
| 2011/0126809 A1 | 6/2011 | Herzer | |
| 2012/0091380 A1 | 4/2012 | Newman | |

OTHER PUBLICATIONS

Grinding Carburetor Needle-Valves Accurately, The Popular Science Monthly, Sep. 1920, vol. 97.

* cited by examiner

PLUNGER VALVE FOR A PROPANE CARBURETOR

CROSS-REFERENCE TO RELATED APPLICATIONS

This application claims the benefit of and priority to U.S. Non-Provisional patent application Ser. No. 14/014,862 filed on Aug. 30, 2013, which application is incorporated herein by reference in its entirety.

U.S. Non-Provisional patent application Ser. No. 14/014,862 claims the benefit of and priority to U.S. Provisional Patent Application Ser. No. 61/695,226 filed on Aug. 30, 2012, which application is incorporated herein by reference in its entirety.

U.S. Non-Provisional patent application Ser. No. 14/014,862 is a continuation-in-part of, and claims the benefit of and priority to, U.S. Non-Provisional patent application Ser. No. 12/983,795 filed on Jan. 3, 2011, which application is incorporated herein by reference in its entirety.

U.S. Non-Provisional patent application Ser. No. 12/983,795 claims the benefit of and priority to U.S. Provisional Patent Application Ser. No. 61/291,991 filed on Jan. 4, 2010, which application is incorporated herein by reference in its entirety.

BACKGROUND OF THE INVENTION

Gasoline carburetors have been used extensively in internal combustion engines. Small engines and large engines have both been designed with carburetors to provide the fuel and air mixture needed to power the engine. In particular, the engine pulls in a fuel and air mixture from the carburetor where it is combusted, producing mechanical power. The carburetor, in turn, pulls in fuel and air in the correct ratio and mixes them. Small engines, in particular, benefit from the relative simplicity of the carburetor and the mechanical reliability of the carburetor over long periods of time.

Gasoline, as a fuel, however, has a number of drawbacks. For example, gasoline engines, especially small engines, may need to be primed and properly choked to allow the engine to start. Over priming of the engine can flood the engine. Once the engine has been flooded, the operator must generally wait for a period of time for the excess gasoline to evaporate from the combustion chamber before attempting to once again start the engine.

In addition, gasoline does not work well as a fuel at colder temperatures. In particular, in colder applications engines often will not start on their own. Instead the engine must be heated before starting or else the gasoline will not ignite. I.e., the operator must turn on a heater, either electric or using some other fuel source, which heats the engine for a time before turning on the engine. This can lead to unacceptable delays.

Further, gasoline produces a high amount of carbon dioxide emissions. Carbon dioxide is considered by some to be a greenhouse gas, the excess production of which is implicated in global warming. In addition, gasoline can contain a number of other pollutants, such as sulfur, carbon monoxide, nitrogen oxides and hydrocarbons, which can be released into the atmosphere when the gasoline is combusted. The production of these pollutants has become highly regulated by a number of governments because of their adverse environmental effects.

Moreover, gasoline makes for difficult throttle control. That is, slight changes in the throttling of gasoline engines can make for large changes in the power produced in the engine. Additionally, the ratio of gasoline to air is quite sensitive, making precise throttling adjustments with gasoline engines difficult. This is particularly true at lower temperatures. The ratio of gasoline to air needs to be higher at lower temperature and lower at higher at lower temperatures, making the engine difficult to control at times, especially in cold weather applications. This can be especially troublesome when precise engine control is required.

Finally, gasoline which is spilled can contaminate the immediate area. The gasoline can evaporate into the atmosphere where it is a pollutant. Alternatively, the gasoline can foul other equipment. For example, in ice fishing a drill is used to drill through the ice to reach water. If the ice fisherman spills gasoline or gets it on his hands or otherwise spreads it such that the gasoline gets on the fishing equipment, the equipment is fouled and cannot be used until the equipment is cleaned.

There are other fuels available for engines. For example, natural gas, propane and other volatile hydrocarbons are readily available. Because they are gases, when not stored under pressure, the chances of contamination are much lower. Additionally, engines using volatile hydrocarbons do not need to be primed, as the fuel naturally and quickly diffuses to the combustion chamber. Further, the operating temperature ranges of these fuels are much larger and the throttle control may be much better. However, standard carburetors are poorly suited for propane engines and engines which use other volatile hydrocarbons. The ratio of fuel to air in these engines can vary dramatically from the ratio used in a gasoline engine.

Accordingly, there is a need in the art for a carburetor which works with non-gasoline engines. Further, there is a need in the art for the carburetor to provide accurate throttle control for the engine, even at lower temperatures. In addition, there is a need in the art for a carburetor which works with fuels that are unlikely to contaminate other equipment.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a plunger valve. The plunger valve includes a body and a set of flutes on the body configured to reduce wedging during operation and eliminate flutter when connected to a diaphragm. The set of flutes includes at least four flutes and are each symmetrically spaced about the axis of the body. The plunger valve also includes a tip.

Another example embodiment includes a plunger valve. The plunger valve includes a body, configured to reduce wedging during operation and eliminate flutter when connected to a diaphragm, where the length of the body is between 13 millimeters and 20 millimeters. The plunger valve also includes a set of flutes on the body configured to reduce wedging during operation and eliminate flutter when connected to a diaphragm, where the set of flutes are each symmetrically spaced about the axis of the body. The plunger valve further includes a tip.

Another example embodiment includes a propane carburetor. The propane carburetor includes an air intake, where the air intake allows air to enter the carburetor. The propane carburetor also includes a propane intake. The propane intake allows propane to enter the carburetor and includes a plunger valve. The plunger valve includes a body, where the length of the body is less than 20 millimeters and a set of flutes on the body configured to reduce wedging during operation and eliminate flutter when connected to a diaphragm, where the set of flutes are each symmetrically spaced about the axis of the body. The plunger valve also includes a tip. The propane carburetor additionally includes a mixing chamber, where the propane entering the carburetor through the propane intake and the air entering the carburetor through the air intake are mixed in the mixing chamber.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

I. Propane Carburetor

Figure 1A:
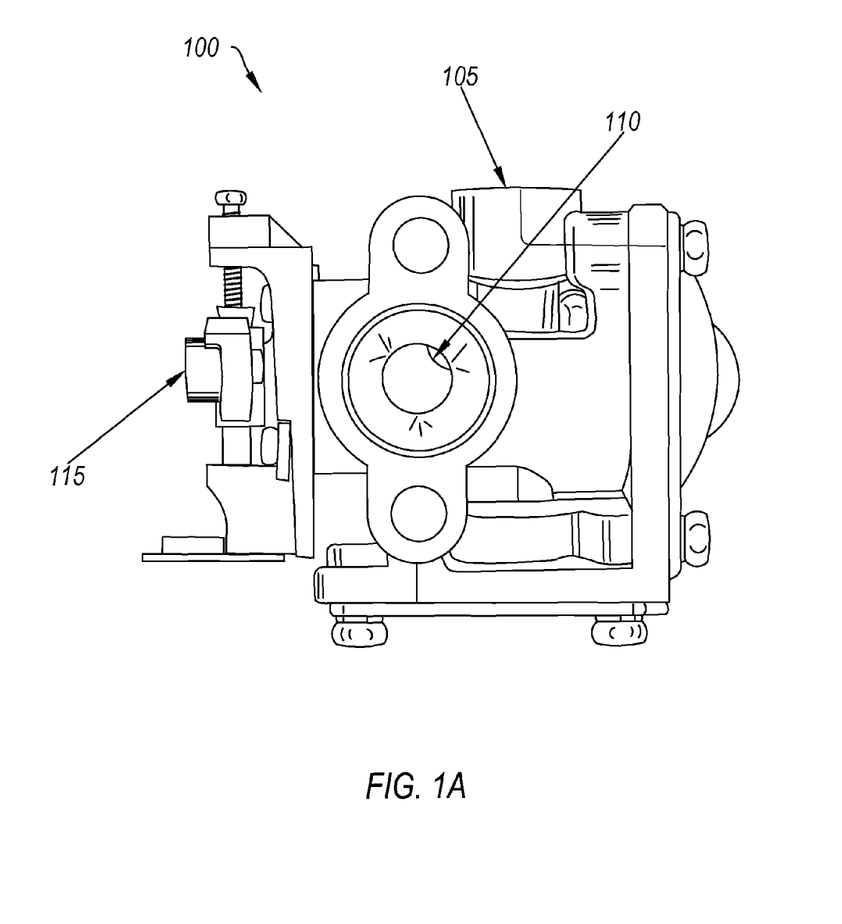
FIG. 1A illustrates a side view of a propane carburetor.
Figure 1B:
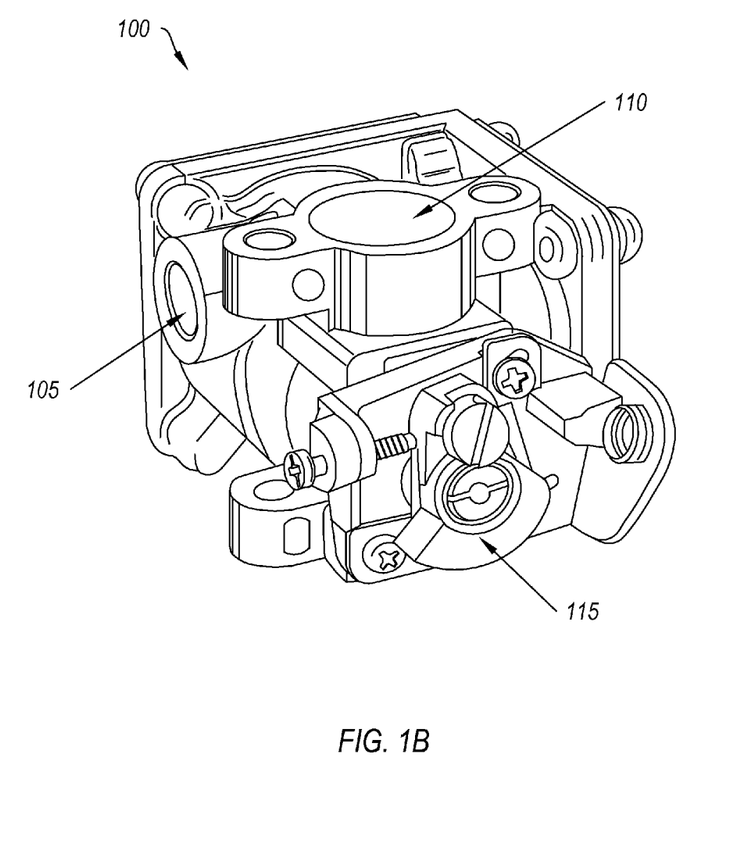
FIG. 1B illustrates a perspective view of the propane carburetor.
Figure 1C:
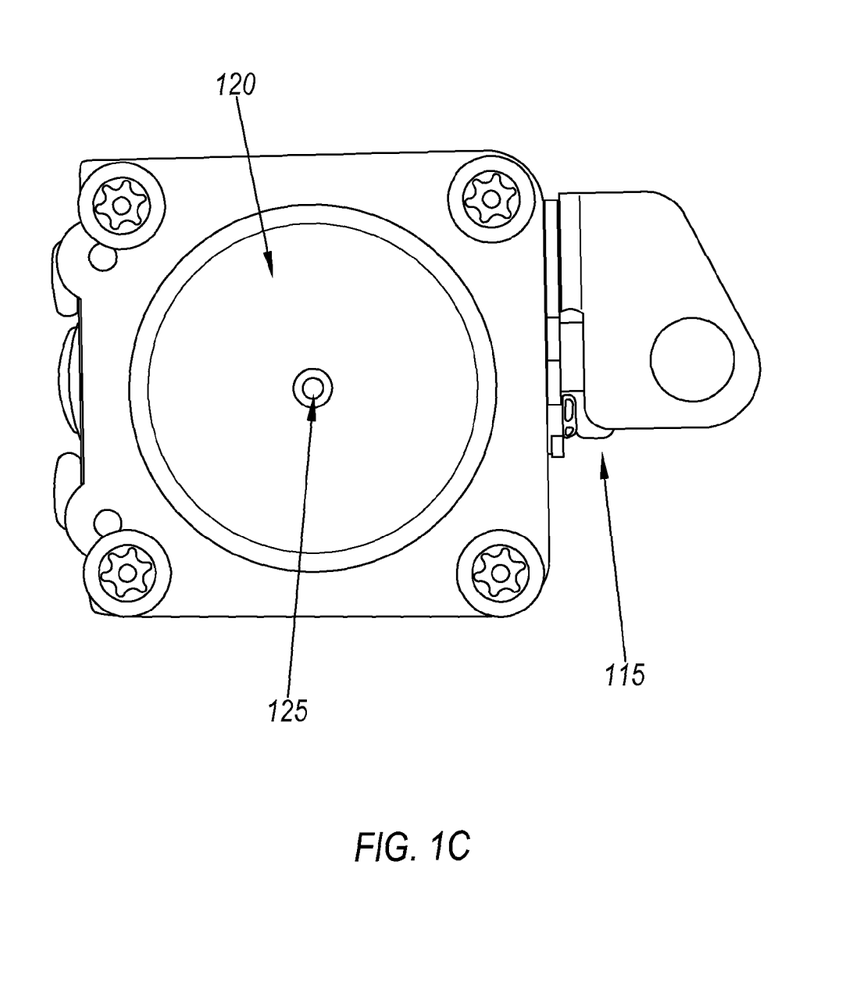
FIG. 1C illustrates an alternative side view of the propane carburetor.

FIGS. 1A, 1B and 1C illustrate an example of a propane carburetor 100. FIG. 1A illustrates a side view of the propane carburetor 100; and FIG. 1B illustrates a perspective view of the propane carburetor 100; and FIG. 1C illustrates an alternative side view of the propane carburetor 100. In at least one implementation, the propane carburetor 100 (also carburettor or carburetter) is a device that blends air and propane for an internal combustion engine. In particular, the propane carburetor 100 mixes propane and air in a predetermined ratio and allows the mixture to flow into an internal combustion engine where it can be converted into mechanical energy. One of skill in the art will appreciate that although propane is treated as exemplary herein, the propane carburetor and any other parts in the specification and the claims can be used with other fuel types, such as other volatile hydrocarbons, unless otherwise specified.

In at least one implementation, propane can offer a number of benefits over other fuels. In particular, the engine can be started without priming, choking or the risk of flooding. Additionally or alternatively, propane has a wide operating range. In particular, propane remains an effective fuel between temperatures of −25 degrees Celsius or lower and 35 degrees Celsius. Further, propane produces fewer emissions than other fuels and does not leave contaminants if spilled.

FIGS. 1A, 1B and 1C show that the propane carburetor 100 can include a propane intake 105. In at least one implementation, the propane intake 105 allows propane to enter the propane carburetor 100. The propane will enter a mixing chamber within the propane carburetor 100. The flow of propane does not need to be forced or pumped, as the flow of air in the mixing chamber and the vapor pressure of the propane will create a pressure gradient which causes the correct amount of propane into the mixing chamber, as discussed below.

FIGS. 1A, 1B and 1C also show that the propane carburetor 100 can include an air intake 110. In at least one implementation, the air intake 110 allows air to enter the propane carburetor 100. One of skill in the art will appreciate that air can refer to any gas mixture which, when mixed with the propane, will allow the propane to undergo combustion. For example, the air can include air from the atmosphere of some other gas which includes oxygen for propane combustion.

In at least one implementation, the propane carburetor 100 can include an outlet. The outlet can allow the mixed propane and air to exit the mixing chamber. I.e., the outlet provides the propane and air mixture to the combustion chamber in an engine, where a spark is introduced and the propane is combusted and mechanical energy is produced. In particular, the outlet can be connected to the mixing chamber and the combustion chamber, such that the propane and air mixture can be drawn into the combustion chamber as needed for the engine to produce the required power.

FIGS. 1A, 1B and 1C further show that the propane carburetor 100 can include a disk actuator 115. In at least one implementation, the disk actuator 115 can control the flow of propane and air into the mixing chamber. In particular, the disk actuator 115 can control the air flow into the mixing chamber which, in turn, controls the propane flow into the mixing chamber, as described below. I.e. the disk actuator 115 can be connected to the throttle or throttle cable, allowing the operator to control the power output of the engine.

FIGS. 1A, 1B and 1C additionally show that the propane carburetor 100 can include cover 120. The cover 120 allows the diaphragm and valves below the cover to remain sealed. I.e., the cover 120 holds the necessary parts under the cover in the correct place during operation.

FIGS. 1A, 1B and 1C moreover show that the propane carburetor 100 can include an aperture 125 in the cover 120. The aperture 125 allows outside air to pass through the cover 120. I.e., air can freely flow through the aperture 125 such that the air pressure on both sides of the cover 120 remains equal at all times. That is, the air pressure just below the cover 120 is the ambient air pressure regardless of what the actual value of the ambient pressure.

Figure 2:
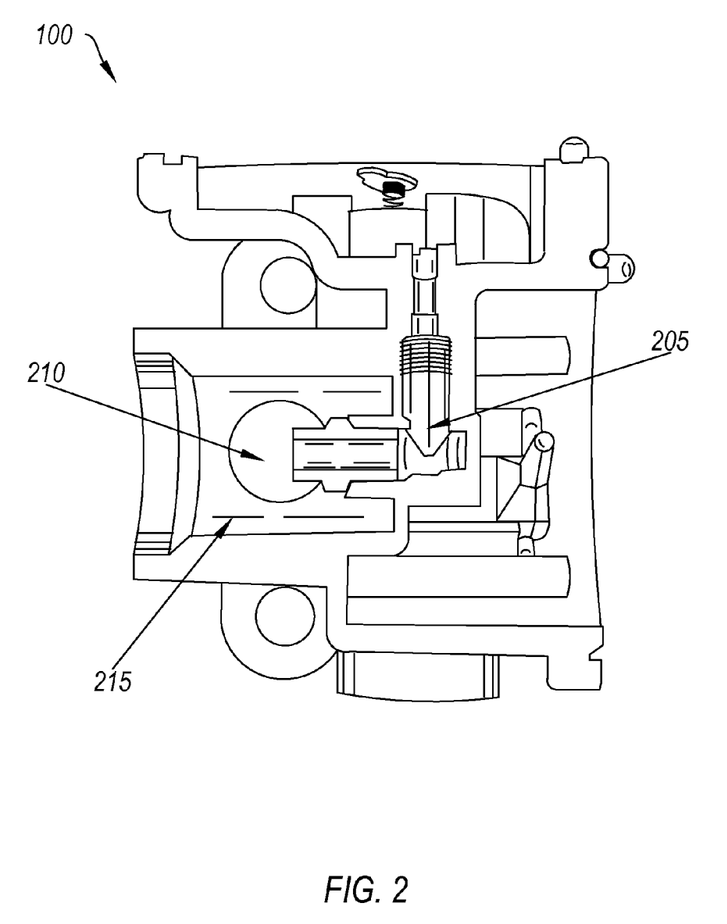
FIG. 2 illustrates a cut away view of the propane carburetor.

FIG. 2 illustrates a cut away view of the propane carburetor 100. The cut-away view can be used to illustrate the propane flow through the propane carburetor 100. The propane carburetor 100 can be used to mix propane and air to be supplied to the combustion chamber, as described above. In particular, the propane carburetor 100 can be configured to work effectively with propane, a fuel that most carburetors are unsuitable for mixing in the proper ratio with air.

FIG. 2 shows that the propane carburetor 100 can include a passage 205. In at least one implementation, propane can enter the propane carburetor 100 through the passage 205. The flow rate of propane through the passage 205 can be controlled by the flow of air through the propane carburetor 100, as described below. Additionally, a needle valve can be used to control the amount of propane flowing through the passage 205, as described below. I.e., the propane can be pulled through the passage 205 at a variable rate which depends on the air flow and the position of a needle valve which provides the proper propane to air ratio based on its position and the position of the throttle.

FIG. 2 also shows that the propane carburetor 100 can include a venturi 210. In at least one implementation, the venturi 210 includes a constricted section of a pipe, shaft or other system through which a fluid, such as a liquid or gas, is flowing. The constriction results in a reduction in fluid pressure. According to the laws governing fluid dynamics, a fluid's velocity must increase as it passes through a constriction to satisfy the conservation of mass, while its pressure must decrease to satisfy the conservation of energy. Thus any gain in kinetic energy a fluid may accrue due to its increased velocity through a constriction is negated by a drop in pressure. This reduction in pressure in the venturi 210 pulls the propane through the passage 205 in the required amounts.

FIG. 2 further shows that the passage 205 and the venturi 210 can meet to form a mixing chamber 215. In at least one implementation, the pressure of the air entering the mixing chamber 215 through the venturi 210 is lower than ambient pressure. I.e., the air that enters the air intake is at ambient pressure, as the air passes through the venturi 210 the flow rate of the air is increased, but the pressure of the air is decreased. This decrease in air pressure results in a pressure imbalance within the passage 205. I.e., the propane intake pressure is higher than the pressure of the mixing chamber 215. This pressure imbalance forces the propane through the passage 205 into the mixing chamber 215.

Figure 3A:
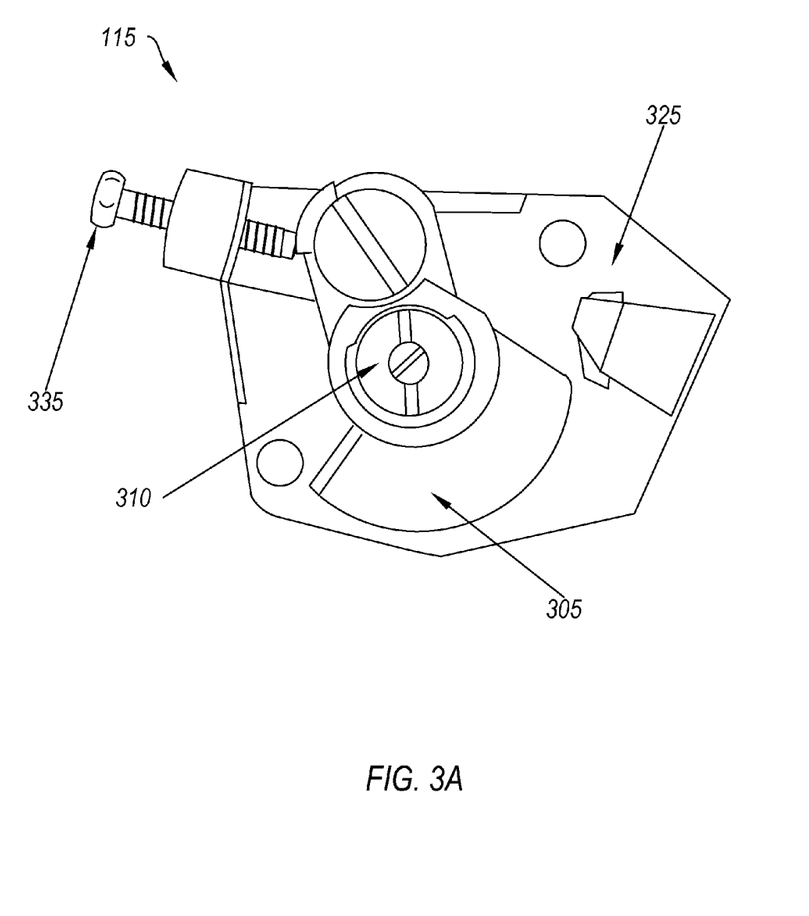
FIG. 3A illustrates a side view of the disk actuator in idle position.
Figure 3B:
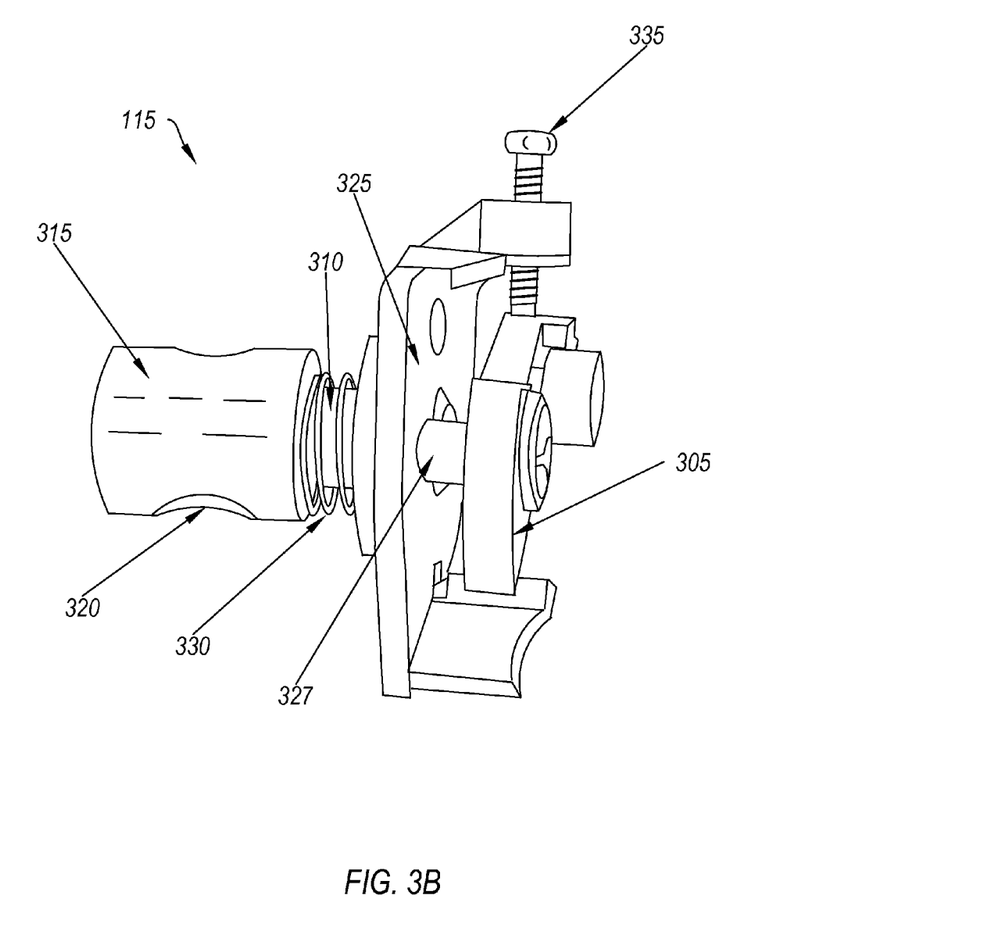
FIG. 3B illustrates a perspective view of the disk actuator in idle position.

FIGS. 3A and 3B illustrate an example of a disk actuator 115 in idle position. FIG. 3A illustrates a side view of the disk actuator 115; and FIG. 3B illustrates a perspective view of the disk actuator 115. In at least one implementation, the disk actuator 115 is configured to control the flow of air and propane entering a propane carburetor, as described above. In particular, the disk actuator can be connected to a throttle controlled by an operator. The throttle can allow the operator to control the amount of propane and air entering a propane carburetor, which, in turn, controls the amount of power produced by the engine.

FIGS. 3A and 3B show that the disk actuator 115 can include a disk 305. One of skill in the art will appreciate that the disk need not be circular in shape. I.e., the disk 305 can include a disk or cylinder having an irregular form. That is, disk 305 can be shaped such that the diameter varies in different directions from the center of the disk 305. The varying diameter can allow for a nonrotational force to be applied to a particular portion of the disk 305 to be translated to rotational force. I.e., the disk 305 can include a portion that can translate linear motion over a short range into rotational motion.

FIGS. 3A and 3B also show that the disk actuator 115 can include a shaft 310. In at least one implementation, the disk 305 is attached to the shaft 310. Attaching the disk 305 to the shaft 310 can allow the rotational motion induced in the disk 305 to be transferred to the shaft 310. That is, if force is applied to the disk 305, the force is translated into rotational force of the disk 305, which, in turn, rotates the shaft 310. Rotation of the shaft 310 can allow more air to enter the propane carburetor, as described below. In particular, the rotation of the shaft 310 can transfer the force to the interior mechanisms of the disk actuator 115.

FIGS. 3A and 3B further show that the disk actuator 115 can include a plug 315. In at least one implementation, the plug 315 is configured to reside in a mixing chamber of a propane carburetor, such as the mixing chamber 215 shown in FIG. 2. The plug 315 can control the air flow through the mixing chamber which, in turn, can control the flow rate of the propane into the mixing chamber, as described above. For example, the plug 315 can rotate within the mixing chamber, allowing more or less air and propane to enter the mixing chamber, as desired by the operator.

FIGS. 3A and 3B show that the plug 315 can include a channel 320. In at least one implementation, the channel 320 can be aligned with the air intake and outlet of a propane carburetor, such as the air intake 110 and the outlet of FIGS. 1A, 1B and 1C. The amount of alignment can be used to control the air flow. In particular, if the channel 320 is not aligned with the air intake, no air can flow into the mixing chamber and the engine is, therefore, inoperable. However, if the channel 320 is aligned with the air intake to a low degree, only a small amount of air and propane can flow into the mixing chamber and the engine will produce little power. For example, the engine may be idling or at a very low throttle position. In contrast, if the channel 320 is aligned to a high degree with the air intake, then a high amount of air and propane will flow into the mixing chamber and the engine will produce a relatively higher amount of power.

One of skill in the art will appreciate that a force on the disk 305 can be used to align the channel 320 with the air intake. In particular, a throttle can be connected to the disk 305. Force on the throttle can be transferred to the disk 305 which will rotate the shaft 310. This will, in turn rotate the plug and adjust the alignment between the channel 320 with the air intake, which adjusts the amount of air and propane introduced into the combustion chamber. Thus, the operator can adjust the amount of power by adjusting the throttle.

FIGS. 3A and 3B further show that the disk actuator 115 can include a base 325. In at least one implementation, the base 325 can surround the shaft 310. The base 325 can include a guide 327 which is pushes the disk 305 away from the base 325 when the disk 305 is rotated, as described below. Additionally or alternatively, the base 325 can include a projection and the plug 315 can be mounted on the projection of the base 325. The interface between the plug 315 and the base 325 can include a threading. The threading can include a helical structure used to convert between rotational and linear movement or force. The conversion of force by the threading can bias the engine toward an idling position, as described below.

FIGS. 3A and 3B further show that the disk actuator 120 can include a compressed spring 330. In at least one implementation, the compressed spring 330 is configured to push the plug 315 away from the base 325 along the shaft 310. That is, unless there is a force which overcomes the force provided by the compressed spring 330, the compressed spring 330 will push the plug 315 away from the base 325 until rotational or linear motion of the plug 315 is prevented. For example, the movement of the plug 315 away from the base 325 can be prevented by the guide 327 or by a threaded interface between the plug 315 and the base 325. Thus, the spring 330 biases the channel 320 in a particular alignment relative to the air intake.

FIGS. 3A and 3B also show that the disk actuator 115 can include an idle screw 335. In at least one implementation, the idle screw 335 can allow a small amount of air and propane to enter the mixing chamber. In particular, the idle screw 335 prevents the disk 305 from rotating counter-clockwise, as shown in FIG. 3A, keeping a low level of alignment between the channel 320 and the air intake. This allows a small amount of air and propane to continue to enter the mixing chamber and pass into the combustion chamber.

In at least one implementation, the idle screw 335 can be configured to adjust the base alignment of the channel 320 relative to the air intake. In particular, as the idle screw 335 is screwed in, the alignment between the channel 320 and the air intake can be increase. Thus, the amount of air and propane entering the mixing chamber, and therefore the combustion chamber, is increased. In contrast, as the idle screw 335 is screwed out, the alignment between the channel 320 and the air intake can be decreased. Thus, the amount of air and propane entering the mixing chamber, and therefore the combustion chamber, is decreased.

Figure 4A:
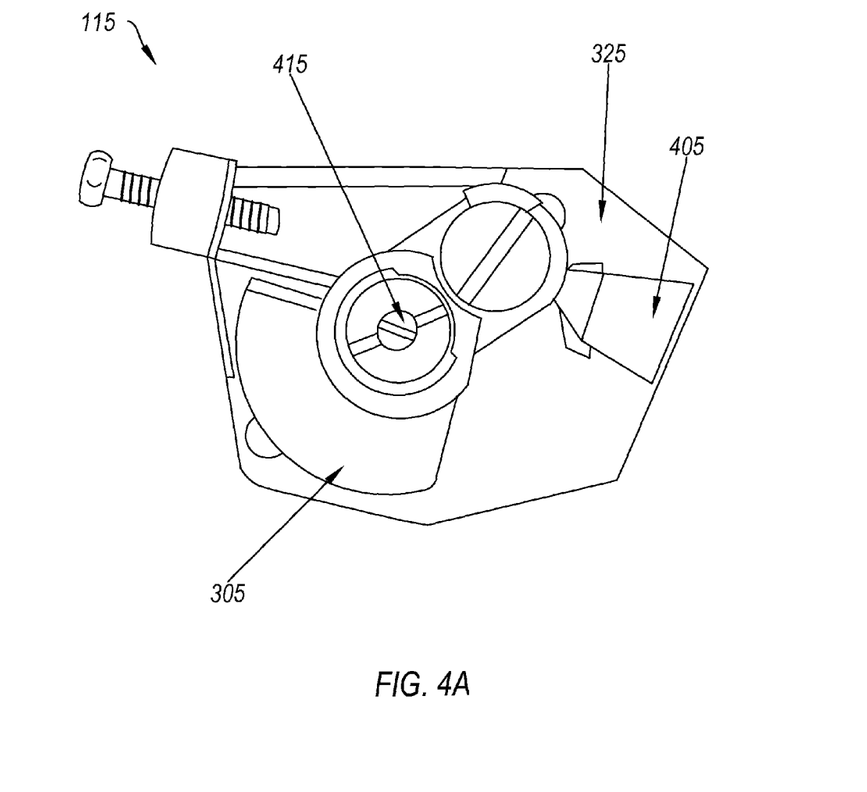
FIG. 4A illustrates a side view of the disk actuator at full throttle.
Figure 4B:
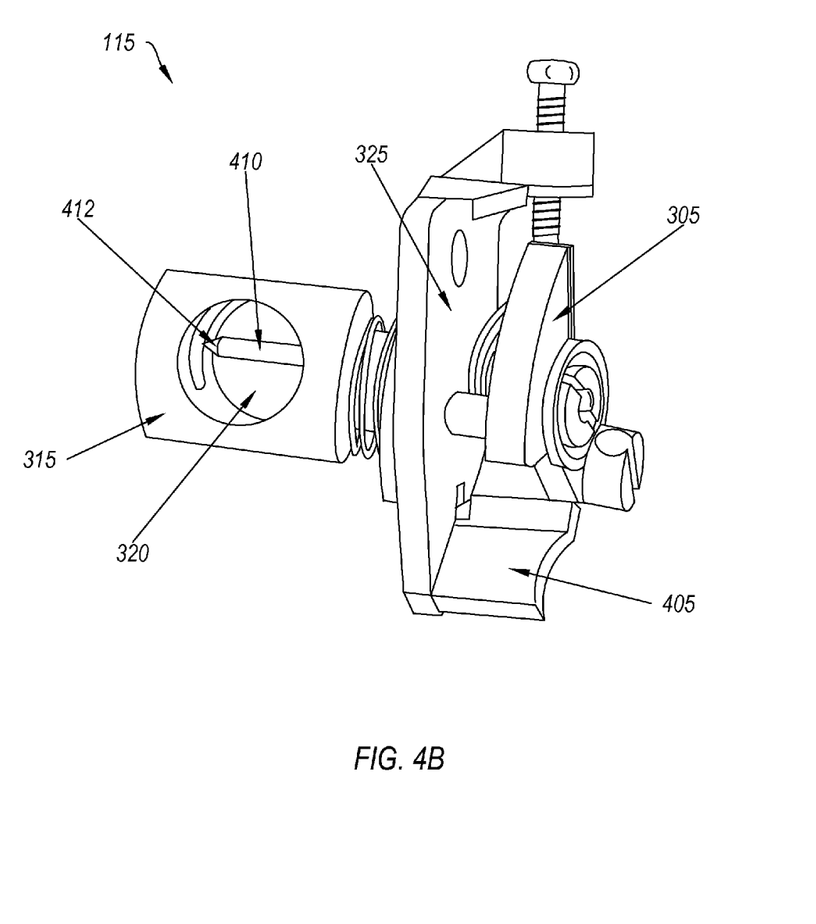
FIG. 4B illustrates a perspective view of the disk actuator at full throttle.

FIGS. 4A and 4B illustrate and example of a disk actuator 115 at full throttle. FIG. 4A illustrates a side view of the disk actuator 115; and FIG. 4B illustrates a perspective view of the disk actuator 115. In at least one implementation, the disk actuator 115 at full throttle is configured to supply the maximum amount of air and propane to the engine. I.e., the disk actuator at full throttle allows the engine to produce the maximum amount of power.

FIGS. 4A and 4B show that the disk 305 is rotated relative to the position of the disk 305 as shown in FIGS. 3A and 3B. In at least one implementation, the throttle can be configured to position the disk in any position between the positions shown in FIGS. 3A and 3B and the positions shown in FIGS. 4A and 4B. Additionally or alternatively, the throttle can be configured to position the disk only in the position shown in FIGS. 4A and 4B when force is applied to the throttle. This rotation of the disk 305, in turn, changes the orientation and position of the plug 315 relative to the propane carburetor.

FIGS. 4A and 4B further show that the disk actuator 115 can include a stop 405. In at least one implementation, the stop 405 is configured to stop the disk 305 as it rotates clockwise, as shown in FIG. 4A. I.e., the disk 305 is not allowed to rotate completely about the shaft. As the disk 305 stops rotating the channel 320 and the air intake are fully aligned. That is, the maximum amount of air and propane enter the mixing chamber and, therefore, the combustion chamber, producing the maximum amount of power output from the engine.

FIGS. 4A and 4B also show that the disk actuator 115 can include a needle-shaped plunger 410. In at least one implementation, the needle-shaped plunger 410 works in conjunction with a valve seat to form a needle valve. In particular, the needle-shaped plunger 410 can include a tapered end 412 which can be inserted into the valve seat, such as the end of the passage 205 of FIG. 2, in order to form a needle valve which controls the amount of propane flowing into the mixing chamber. The distance between the needle-shaped plunger 410 and the valve seat can control the amount of propane flowing into the mixing chamber. I.e., adjusting the needle-shaped plunger 410 can adjust the propane to air ratio, as described below.

In at least one implementation, the rotation of the disk 305 adjusts the position of the needle-shaped plunger 410 relative to the valve seat. In particular, as the disk 305 is rotated toward the stop 405, the needle-shaped plunger 410 moves toward the base 325. This movement, in turn, further separates the needle-shaped plunger 410 and the valve seat, increasing the amount of propane entering the mixing chamber and, therefore, the combustion chamber.

FIGS. 4A and 4B further show that the needle-shaped plunger 410 includes a head 415. A screwdriver or other tool can be inserted into the head 415 in order to change the alignment of the needle-shaped plunger 410 relative to the valve seat. In particular, as the head 415 is turned counter-clockwise and the needle-shaped plunger 410 is retracted, the distance between the valve seat and the plunger is increased; however, the needle-shaped plunger 410 continues to impede the flow somewhat. Thus, as the head is further turned, the flow of propane increases. Since it can take many turns of the head 415 to retract the plunger, precise regulation of the flow rate is possible. In contrast, as the head 415 is turned clockwise the needle-shaped plunger 410 is moved toward the valve seat, and the flow of propane is reduced. One of skill in the art will understand that the threading of the needle-shaped plunger 410 can be left-handed rather than right-handed; therefore turning the head 415 counter-clockwise can impede the flow of propane while turning the head 415 clockwise can increase the flow rate of the propane.

II. Plunger Valve and Operation

Figure 5A:
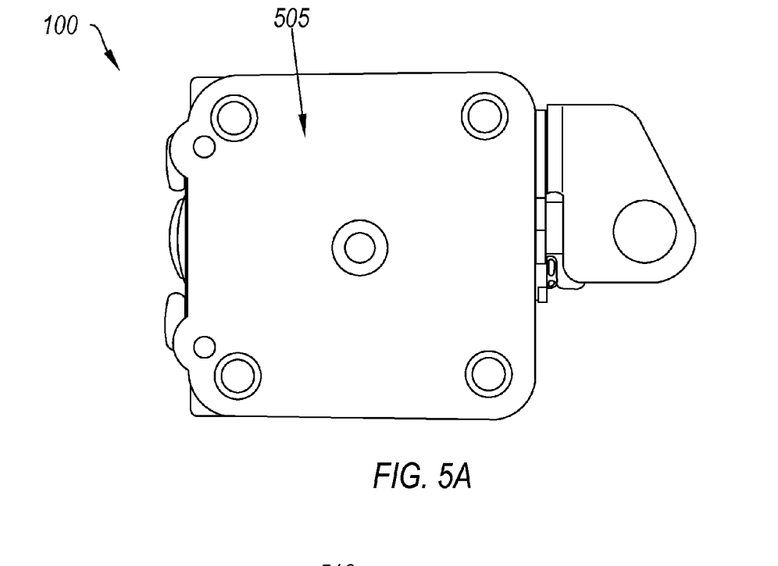
FIG. 5A illustrates a first side of the diaphragm of the carburetor.
Figure 5B:
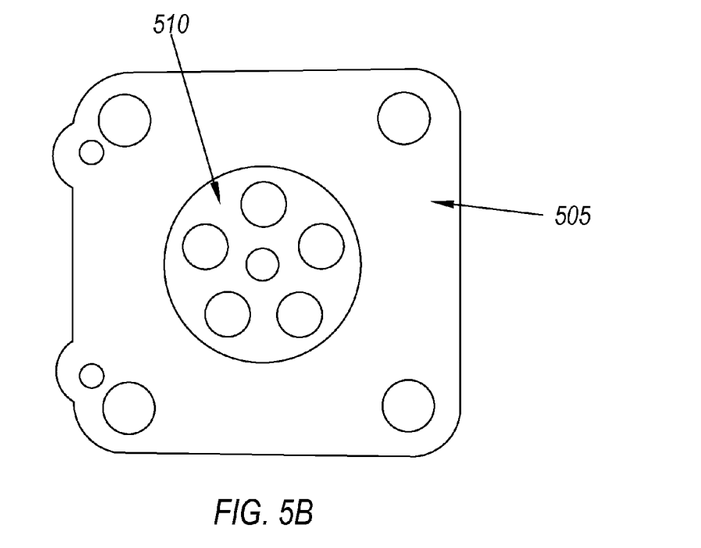
FIG. 5B illustrates the opposite side of the diaphragm of the carburetor.

FIGS. 5A and 5B illustrate the carburetor 100 of FIG. 1C with the cover 120 removed. FIG. 5A illustrates a first side of the diaphragm 505 of the carburetor 100; and FIG. 5B illustrates the opposite side of the diaphragm 505 of the carburetor 100. FIGS. 5A and 5B show that the carburetor 100 can include a diaphragm 505. The diaphragm 505 includes a thin sheet of material forming a partition. In at least one implementation, the diaphragm 505 can separate chambers with different air pressures. For example, the outside of the diaphragm 505 can be in contact with the ambient air pressure that enters through the aperture 125 of FIG. 1C. In contrast, the inside of the diaphragm 505 can be in contact with the "internal" pressure of the carburetor 100. The internal pressure is dictated by the movement of the engine cylinder(s).

FIGS. 5A and 5B also show that the diaphragm 505 can include a disk 510. In at least one implementation, the disk 510 can be attached to the diaphragm 505. The disk 510 can provide rigidity to the desired portion of the diaphragm 505. Additionally or alternatively, the disk 510 can provide a surface that can interact with other portions of the diaphragm 505, as described below.

Figure 6:
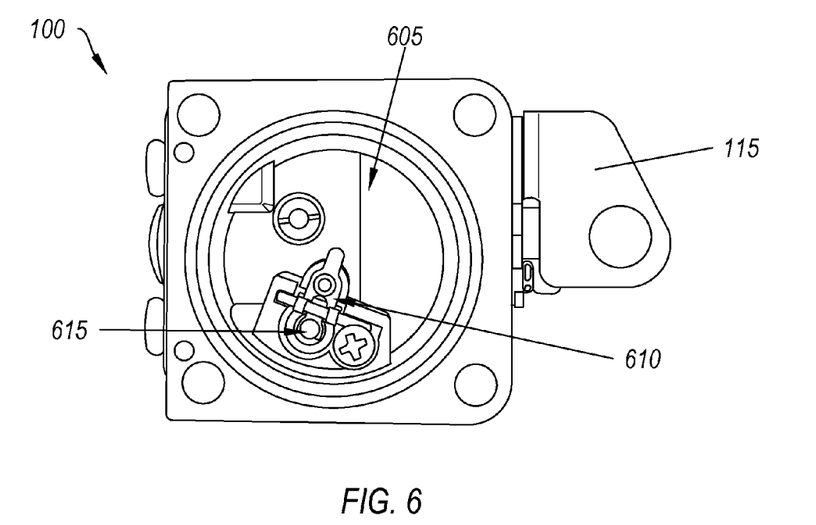
FIG. 6 illustrates the carburetor of FIG. 5 with the diaphragm removed.

FIG. 6 illustrates the carburetor 100 of FIG. 5 with the diaphragm 505 removed. FIG. 6 shows that the carburetor 100 can include a fuel chamber 605. The fuel chamber 605 stores fuel that remains available for the engine. I.e., as the carburetor is required to provide a fuel-air mixture to an engine, the fuel is drawn from the fuel chamber 605 down the passage 205 of FIG. 2. The carburetor 100 includes a disk actuator 115 including a needle-shaped plunger (as described in FIG. 4B).

FIG. 6 also shows that the carburetor 100 can also include a lever 610. In at least one implementation, the lever 610 can include a beam or rigid rod pivoted at a fixed hinge, or fulcrum. A first end of the lever 610 (toward the middle of the mixing chamber 605 as shown in FIG. 6) is biased upward by a spring (as can be seen in FIG. 2). As the diaphragm 505 of FIG. 5 moves inward under pressure, the disk 510 of FIG. 5 is pressed against the first end of the lever 610 causing it to move about the fulcrum.

FIG. 6 further shows that the carburetor 100 can include a plunger valve 615. The plunger valve 615 controls the flow of fuel into the fuel chamber 605. In particular, as the first end of the lever 610 is pressed downward, the other end rises opening the plunger valve 615. While the plunger valve 615 is open, the fuel flows past the plunger valve 615, entering the fuel chamber 605.

Figure 7:
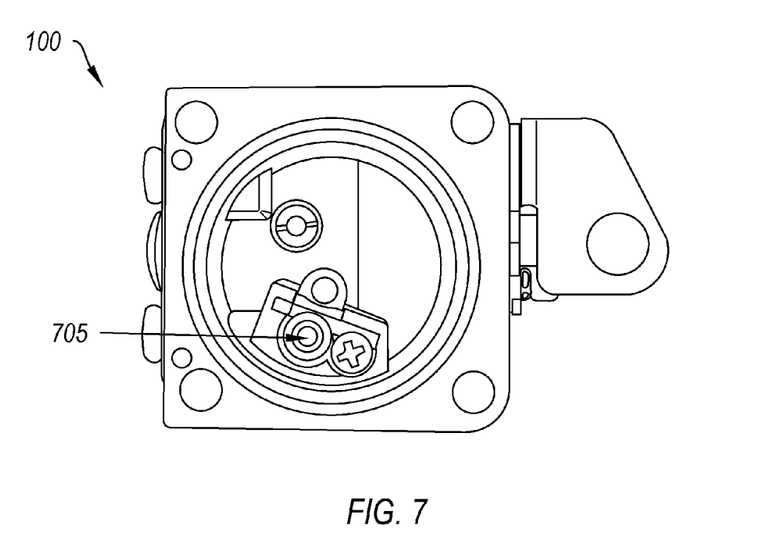
FIG. 7 illustrates the carburetor of FIG. 6 with the plunger valve removed.

FIG. 7 illustrates the carburetor 100 of FIG. 6 with the plunger valve 615 removed. FIG. 7 shows that the carburetor 100 can include a seat 705. The seat 705 is configured to receive the plunger valve 615. In prior configurations, the seat 705 was a simple opening. I.e., the seat 705 was flat with a hole in the middle. However, operation of the carburetor 100 is improved if the shape is changed to match the shape of the plunger valve 615, as described below.

Figure 8A:
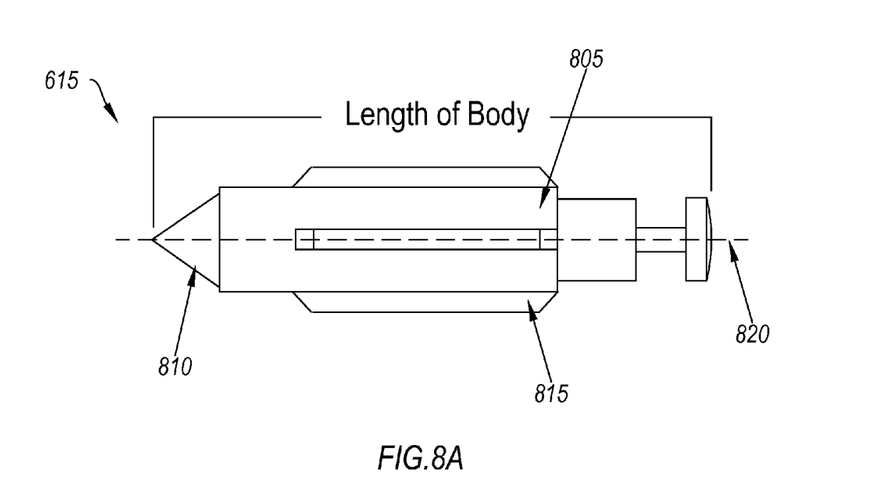
FIG. 8A illustrates a side view of the plunger valve.
Figure 8B:
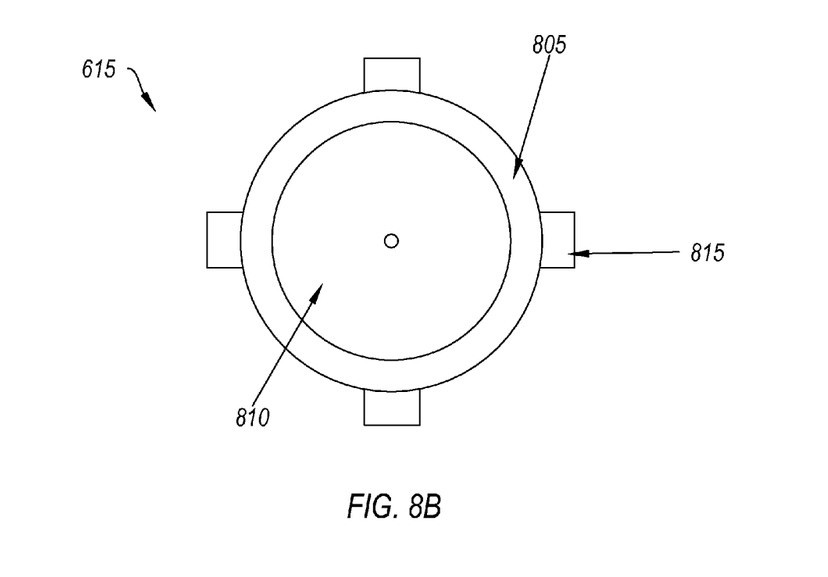
FIG. 8B illustrates an end view of the plunger valve.

FIGS. 8A and 8B illustrate an example of a plunger valve 615. FIG. 8A illustrates a side view of the plunger valve 615; and FIG. 8B illustrates an end view of the plunger valve 615. The size and the shape of the plunger valve 615 can be critical for proper operation of the carburetor. For example, in a series of tests over 1000 carburetors in a prior configuration were tested for correct operation. The failure rate of the tests was over 300 carburetors (i.e., 30%) which malfunctioned at high rpms. In addition, problems could arise later during operation and appeared to be random failure.

Multiple testing and modification of parts did not result in satisfactory progress in preventing failures. After much experimentation it was discovered that the reduction in performance was the result of a flutter in the diaphragm 505 of FIG. 5. After extensive testing involving multiple changes to various portions of the carburetor including the diaphragm 505 of FIG. 5 changes were made to the plunger valve 615 which reduced the failure rate to less than one percent. These changes reduced binding and made the movement of the plunger valve 615 much smoother during operation. Accordingly, these changes are critical to proper operation of the carburetor.

FIGS. 8A and 8B show that the plunger valve 615 can include a body 805. The body 805 can be the main portion of the plunger valve 615. I.e., the body 805 can include the central portion of the plunger valve 615. The body 805 can be long enough to allow for smoother operational action (less binding). For example, the body 805 can be between 13 millimeters and 20 millimeters in length (as shown by the length indicator in FIGS. 8A and 8B). In particular, the body 805 can be approximately 16.5 millimeters in length. As used in the specification and the claims, the term approximately shall mean that the value is within 10% of the stated value, unless otherwise specified.

FIGS. 8A and 8B also show that the plunger valve 615 can include a conical shaped tip 810. The conical tip 810 can ensure that the pressure when seated with the valve seat remains uniform creating a better seal by the plunger valve 615. I.e., the conical tip 810 can seat uniformly, preventing any leakage and creating a more stable seal. The conical tip 810 can be configured to seat in a complimentary shaped valve seat. I.e., the valve seat can likewise be conically shaped to match the shape of the conical tip 810. Additionally or alternatively, the conical tip 810 can include a material that is configured to provide a more secure seal. For example, the conical tip 810 can include a soft deformable material such as latex.

FIGS. 8A and 8B further show that the plunger valve 615 can include four or more flutes 815. The four or more flutes 815 can include ribs or longitudinal guides that are aligned longitudinally with the body 805. The four or more flutes 815 can be symmetrically spaced about the axis 820 of the needle-shaped plunger. The flues 815 can be critical to producing a smoother, more linearly-directed needle valve action. I.e., the flutes 815 can eliminate valve binding during starting and running operations. During the previously described testing the plunger valve 615 stuck and stuttered if fewer than four flutes 815 (such as three flutes 815) were used. However, with the addition of a fourth flute 815 the wedging was eliminated and the movement of the plunger valve 615 was smoother, eliminating failures.

III. Operation of a Carburetor

By way of example, operation of a carburetor will be described. I.e., the flow of fuel, air and fuel-air mixture will be described with respect to the carburetor as shown and described. To avoid confusion, reference numbers will be used herein which reflect the numbers previously assigned in the Figures and the specification. However, the Figures in which the reference numbers appear will be omitted.

Internal combustion engines operate on the inherent volume change accompanying oxidation of a fuel. The expansion moves a cylinder back and forth in a reciprocating motion. The reciprocating motion of the pistons is translated into crankshaft rotation via connecting rod(s). As a piston moves back and forth, a connecting rod changes its angle; its distal end has a rotating link to the crankshaft. A four stroke engine has four stages which includes two reciprocations of the cylinder (hence its name), each of which occurs during one revolution of the engine. The stages include:

1. INTAKE stroke: on the intake or induction stroke of the piston, the piston descends from the top of the cylinder to the bottom of the cylinder, increasing the volume of the cylinder. A fuel-air mixture is forced by atmospheric (or greater) pressure into the cylinder through the intake port. The intake valve(s) then closes.
2. COMPRESSION stroke: with both intake and exhaust valves closed, the piston returns to the top of the cylinder compressing the air or fuel-air mixture into the combustion chamber of the cylinder head. During the compression stroke the temperature of the air or fuel-air mixture rises by several hundred degrees.
3. POWER stroke: this is the start of the second revolution of the cycle. While the piston is close to the top of the cylinder, the compressed fuel-air mixture in a gasoline engine is ignited, usually by a spark plug. The resulting pressure from the combustion of the compressed fuel-air mixture forces the piston back down toward the bottom of the cylinder.
4. EXHAUST stroke: during the exhaust stroke, the piston once again returns to the top of the cylinder while the exhaust valve is open. This action expels the spent fuel-air mixture through the exhaust valve(s).

During the intake stroke the pressure in the combustion chamber is greatly reduced. Therefore, pressure in the mixing chamber causes the fuel-air mixture in the mixing chamber 215 to flow into the combustion chamber. That movement causes air to flow through venturi 210 and fuel to flow through passage 205 into the mixing chamber 215.

As fuel flows down passage 205 the pressure in the fuel chamber 605 is reduced. The reduction in pressure causes the diaphragm 505 to move inward toward the fuel chamber 605 under ambient pressure passing through the aperture 125 in the cover 120. The movement of the diaphragm 505, in turn, moves the disk 510 inward in the fuel chamber 605 engaging the lever 610. The plunger valve 615 is then raised allowing fuel to enter the fuel chamber 605. Because the fuel is pressurized, the pressure in the fuel chamber 605 quickly reaches ambient air pressure causing the diaphragm 505 to move back out of the fuel chamber 605 disengaging the disk 510 from the lever 610 and allowing the plunger valve 615 to close, preventing fuel from entering the fuel chamber 605.

Typical engine speeds can range from 3000 rpms (at idle speed) to 9000 rpms (at full throttle). Each revolution includes two strokes of the cylinder within the combustion chamber and two revolutions result in one draw of fuel-air mixture. Therefore, the plunger valve 615 can reciprocate between 1500 times per minute (at idle speed) and 4500 times per minute (at full throttle) or between 25 times per second and 75 times per second. This means that the plunger valve has between approximately 0.013 seconds (at full throttle) and 0.040 seconds (at idle speed). Thus a delay of 1-2 thousandths of a second (0.001-0.002 seconds) caused by binding of the plunger valve 615 can either flood (too much fuel) or stall (too little fuel) the engine. Therefore, the features and dimensions described above are critical to proper operation of the carburetor 100. I.e., even a small amount of binding can lead to failures in engine operation.

These failures are not applicable to engines that use other fuels, such as gasoline, which are a liquid at ambient temperatures. I.e., the fluid dynamics of a propane gas are different than the fluid dynamics of other fuels. Therefore, a shorter plunger valve 615, fewer flutes 815 and a hole in the seat 705 rather than a conical shape might not cause problems in a gasoline carburetor but lead to failures in the operation of the propane carburetor 100.

IV. Conclusion

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A propane carburetor, the propane carburetor comprising:
    an air intake, wherein the air intake allows air to enter the carburetor;
    a propane intake, wherein the propane intake:
        allows propane to enter the carburetor; and
        includes a plunger valve, wherein the plunger valve includes:
            a body, wherein the length of the body is less than 20 millimeters;
            a set of flutes on the body configured to reduce wedging during operation and eliminate flutter when connected to a diaphragm, wherein the set of flutes:
                includes at least four flutes; and
                are each symmetrically spaced about the axis of the body; and
            a tip;
    a mixing chamber, wherein the propane entering the carburetor through the propane intake and the air entering the carburetor through the air intake are mixed in the mixing chamber;
    a passage connecting the propane intake to the mixing chamber; and
    a disk actuator in the air intake, wherein the disk actuator includes:
        a disk;
        a plug, wherein the plug is connected to the disk such that rotation of the disk causes rotation of the plug and wherein the plug includes:
            a channel, wherein the channel is configured to regulate the flow of air into the carburetor;
            a base, wherein:
                the plug is capable of rotating relative to the base;
                rotation of the plug changes the distance between the plug and the base;
            a compressed spring wherein the compressed spring is configured to keep the plug in its furthest position from the base absent an external force; and
        a needle valve, wherein:
            the needle valve includes a needle-shaped plunger which regulates the flow of propane into a mixing chamber of the carburetor;
            at least a portion of the needle-shaped plunger is located within the plug; and
            the needle-shaped plunger includes a tip configured to be inserted into the end of the passage in the mixing chamber.

2. The propane carburetor of claim 1 further comprising:
    an idle screw, wherein the idle screw prevents rotation of the disk beyond a set point.

3. The propane carburetor of claim 1 further comprising:
    a stop, wherein the stop prevents rotation of the disk setting a maximum fuel intake.

4. The propane carburetor of claim 1, wherein the tip of the needle-shaped plunger is tapered.

5. The propane carburetor of claim 1, wherein the distance between the tip of the needle-shaped plunger and the end of the passage in the mixing chamber regulates the flow of propane into a mixing chamber.

6. The propane carburetor of claim 1, wherein movement of the plug induces movement in the needle-shaped plunger.

7. The propane carburetor of claim 1, wherein the needle-shaped plunger includes a head.

8. The propane carburetor of claim 7, wherein the head is configured to receive a tool.

9. The propane carburetor of claim 7, wherein rotation of the head changes the distance between the tip of the needle-shaped plunger and the end of the passage in the mixing chamber.

10. A propane carburetor, the propane carburetor comprising:
    an air intake, wherein the air intake allows air to enter the carburetor;
    a propane intake, wherein the propane intake:
        allows propane to enter the carburetor; and
        includes a plunger valve, wherein the plunger valve includes:
            a body, wherein the length of the body is between 13 and 20 millimeters;
            a set of flutes on the body configured to reduce wedging during operation and eliminate flutter when connected to a diaphragm between the fuel chamber and an external environment, wherein the set of flutes:
                includes at least four flutes; and
                are each symmetrically spaced about the axis of the body; and
            a conical tip, configured to create a secure seal and prevent propane leakage;
    a mixing chamber, wherein the propane entering the carburetor through the propane intake and the air entering the carburetor through the air intake are mixed in the mixing chamber;
    a passage connecting the propane intake to the mixing chamber;

a disk actuator in the air intake, wherein the disk actuator includes:
  a disk;
  a plug, wherein the plug is connected to the disk such that rotation of the disk causes rotation of the plug and wherein the plug includes:
    a channel, wherein the channel is configured to regulate the flow of air into the carburetor;
    a base, wherein:
      the plug is capable of rotating relative to the base;
      rotation of the plug changes the distance between the plug and the base;
    a compressed spring wherein the compressed spring is configured to keep the plug in its furthest position from the base absent an external force; and
    a needle valve, wherein:
      the needle valve includes a needle-shaped plunger which regulates the flow of propane into a mixing chamber of the carburetor;
      at least a portion of the needle-shaped plunger is located within the plug; and
      the needle-shaped plunger includes a tip configured to be inserted into the end of the passage in the mixing chamber;
the fuel chamber, wherein the fuel chamber is configured to store propane prior to mixing;
the diaphragm between the fuel chamber and an external environment;
a disk attached to the diaphragm, wherein the disk is configured to engage a first end of the lever;
wherein the plunger valve is activated by a second end of the lever;
a spring, wherein the spring is:
  in contact with the lever; and
  configured to bias the lever to hold the plunger valve in a closed position; and
a cover over the diaphragm, wherein the cover includes an aperture.

11. The propane carburetor of claim 10, wherein the length of the body is approximately 16.5 millimeters.

12. The propane carburetor of claim 10, wherein the conical tip includes a soft deformable material.

13. The propane carburetor of claim 12 further comprising a seat, wherein at least a portion of the seat is configured to receive the conical tip; and
  wherein the soft deformable material is configured to provide a secure seal when pressed against the seat.

14. The propane carburetor of claim 12, wherein the portion of the seat configured to receive the conical tip includes a conical shaped opening.

15. The propane carburetor of claim 12, wherein the passage includes a venturi.

16. A four stroke engine configured to operate using propane as a fuel source, the four stroke engine comprising:
  a combustion chamber, wherein the combustion chamber:
    is configured to receive a propane air mixture;
    allows the propane/air mixture to undergo combustion; and
    output mechanical power; and
  a propane carburetor, the propane carburetor including:
    an air intake, wherein the air intake allows air to enter the carburetor;
    a propane intake, wherein the propane intake:
      allows propane to enter the carburetor; and
      includes a plunger valve, wherein the plunger valve includes:
        a body, wherein the length of the body is between 13 and 20 millimeters;
        a set of flutes on the body configured to reduce wedging during operation and eliminate flutter when connected to a diaphragm between the fuel chamber and an external environment, wherein the set of flutes:
          includes at least four flutes; and
          are each symmetrically spaced about the axis of the body; and
        a conical tip, configured to create a secure seal and prevent propane leakage;
    a mixing chamber, wherein the propane entering the carburetor through the propane intake and the air entering the carburetor through the air intake are mixed in the mixing chamber;
    an outlet connecting the mixing chamber to the combustion chamber;
    a passage connecting the propane intake to the mixing chamber;
    a disk actuator in the air intake, wherein the disk actuator includes:
      a disk;
      a plug, wherein the plug is connected to the disk such that rotation of the disk causes rotation of the plug and wherein the plug includes:
        a channel, wherein the channel is configured to regulate the flow of air into the carburetor;
        a base, wherein:
          the plug is capable of rotating relative to the base;
          rotation of the plug changes the distance between the plug and the base;
        a compressed spring wherein the compressed spring is configured to keep the plug in its furthest position from the base absent an external force; and
        a needle valve, wherein:
          the needle valve includes a needle-shaped plunger which regulates the flow of propane into a mixing chamber of the carburetor;
          at least a portion of the needle-shaped plunger is located within the plug; and
          the needle-shaped plunger includes a tip configured to be inserted into the end of the passage in the mixing chamber;
    the fuel chamber, wherein a fuel chamber is configured to store propane prior to mixing;
    the diaphragm between the fuel chamber and an external environment;
    a disk attached to the diaphragm, wherein the disk is configured to engage a first end of the lever;
    wherein the plunger valve is activated by a second end of the lever;
    a spring, wherein the spring is:
      in contact with the lever; and
      configured to bias the lever to hold the plunger valve in a closed position; and
    a cover over the diaphragm, wherein the cover includes an aperture.

17. The propane engine of claim 16, further comprising:
a throttle, wherein the throttle:
  is connected to the disk in the disk actuator; and
  can induce rotation in the disk.

18. The propane engine of claim 16, wherein each flute is directly opposite another flute.

19. The propane engine of claim 16, wherein the ratio of the length of the body to a diameter of the body is approximately 5.4.

20. The propane engine of claim 16, in an ice drill.

* * * * *